(12) United States Patent
Sakurada

(10) Patent No.: US 12,353,558 B2
(45) Date of Patent: Jul. 8, 2025

(54) INFORMATION PROCESSING SYSTEM, INFORMATION PROCESSING APPARATUS, AND INFORMATION PROCESSING METHOD

(71) Applicant: Daiki Sakurada, Kanagawa (JP)

(72) Inventor: Daiki Sakurada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 337 days.

(21) Appl. No.: 17/953,490

(22) Filed: Sep. 27, 2022

(65) Prior Publication Data
US 2023/0177163 A1 Jun. 8, 2023

(30) Foreign Application Priority Data
Dec. 8, 2021 (JP) .................. 2021-199303

(51) Int. Cl.
G06F 21/57 (2013.01)
H04L 9/32 (2006.01)

(52) U.S. Cl.
CPC .......... *G06F 21/575* (2013.01); *H04L 9/3239* (2013.01); *G06F 2221/034* (2013.01)

(58) Field of Classification Search
CPC ..................................... G06F 9/455
See application file for complete search history.

(56) References Cited

U.S. PATENT DOCUMENTS 11,537,716 B1 * 12/2022 Choudhary ............. H04L 63/14
12,015,721 B1 * 6/2024 Kumar .................. H04L 9/3263
12,045,351 B2 * 7/2024 Kennedy ................... H04L 9/30
2016/0306976 A1 10/2016 Gantman et al.
2019/0095138 A1 3/2019 Sakurada et al.
2020/0159931 A1 5/2020 Schutt
2021/0096837 A1 * 4/2021 Kim ....................... G06F 21/74
2021/0144014 A1 5/2021 Sakurada (Continued)

FOREIGN PATENT DOCUMENTS

JP 2013-254506 12/2013
JP 2019-003275 1/2019
JP 2021-077971 5/2021

OTHER PUBLICATIONS

European Search Report; Application 22200528.2; May 9, 2023.

*Primary Examiner* — Phil K Nguyen
(74) *Attorney, Agent, or Firm* — Duft & Bornsen, PC

(57) ABSTRACT

An information processing system includes a first information processing apparatus and a second information processing apparatus. The first information processing apparatus includes first circuitry. The first circuitry generates signature data for an update file based on a hash value obtained based on the update file and provide the update file. The second information processing apparatus includes second circuitry. The second circuitry obtains the update file and the signature data, verifies the update file with the signature data in updating a start-up file for the second information processing apparatus with the update file, updates the start-up file with the verified update file, generates, based on the hash value obtained based on the signature data, verification data for verifying the updated start-up file, and verifies the updated start-up file with the verification data in starting up the second information processing apparatus with the updated start-up file.

8 Claims, 14 Drawing Sheets

(56) References Cited

U.S. PATENT DOCUMENTS

| | | | |
|---|---|---|---|
| 2021/0200874 A1 | 7/2021 | Markey et al. | |
| 2021/0350027 A1 | 11/2021 | Sakurada | |
| 2021/0385103 A1* | 12/2021 | Hashimoto | H04L 12/2827 |
| 2021/0397441 A1* | 12/2021 | He | G06F 21/64 |
| 2022/0035924 A1* | 2/2022 | Behnck | G06F 21/606 |
| 2022/0318390 A1* | 10/2022 | Ayoub | H04W 12/03 |

\* cited by examiner

INFORMATION PROCESSING SYSTEM, INFORMATION PROCESSING APPARATUS, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2021-199303, filed on Dec. 8, 2021, in the Japan Patent Office, the entire disclosure of which is hereby incorporated by reference herein.

BACKGROUND

Technical Field

The present disclosure relates to an information processing system, an information processing apparatus, and an information processing method.

Related Art

With respect to information processing apparatuses, a technique is known, such as Trusted Boot and Linux-IMA, for verifying a file for boot-up, or start-up, (firmware or software) and detecting if the file has been accidentally or maliciously altered, namely if the file has falsification, corruption, or damage, in order not to execute an invalid file during boot-up.

In addition, an information processing system is known that verifies, in at the time of update, an update file using signature data generated by a network server, and verifies an updated file for boot-up, or start-up, by using a signature file such as Linux-IMA in at the time of boot-up, or start-up.

SUMMARY

An embodiment of the present disclosure includes an information processing system including a first information processing apparatus and a second information processing apparatus. The first information processing apparatus includes first circuitry. The first circuitry generates signature data for an update file based on a hash value obtained based on the update file and provide the update file. The second information processing apparatus includes second circuitry. The second circuitry obtains the update file and the signature data, verifies the update file with the signature data in updating a start-up file for the second information processing apparatus with the update file, updates the start-up file with the verified update file, generates, based on the hash value obtained based on the signature data, verification data for verifying the updated start-up file, and verifies the updated start-up file with the verification data in starting up the second information processing apparatus with the updated start-up file.

An embodiment of the present disclosure includes an information processing apparatus including circuitry. The circuitry obtains an update file and signature data. The update file is for updating a start-up file for the information processing apparatus. The signature data is for verifying the update file. The update file and the signature data are generated by another information processing apparatus. The circuitry verifies the update file with the signature data in updating the start-up file with the update file, updates the start-up file with the verified update file, generates, based on a hash value obtained based on the signature data, verification data for verifying the updated start-up file, and verifies the updated start-up file with the verification data in starting up with the updated start-up file.

An embodiment of the present disclosure includes an information processing method performed by an information processing apparatus. The method includes obtaining an update file and signature data. The update file is for updating a start-up file for the information processing apparatus. The signature data is for verifying the update file. The update file and the signature data are generated by another information processing apparatus. The method includes verifying the update file with the signature data in updating the start-up file with the update file, updating the start-up file with the verified update file, generating, based on a hash value obtained based on the signature data, verification data for verifying the updated start-up file, and verifying the updated start-up file with the verification data in starting up the information processing apparatus with the updated start-up file.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
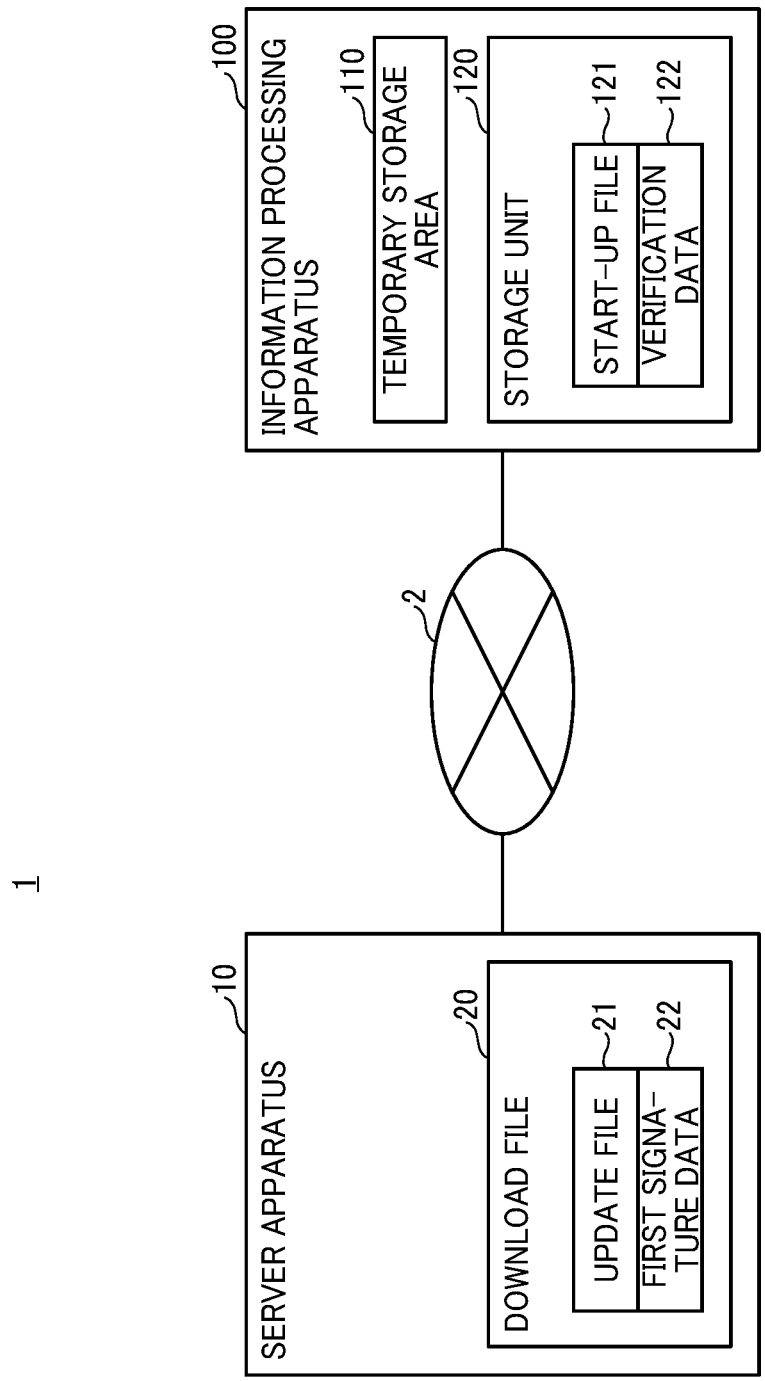
FIG. 1 is a diagram illustrating an example of a system configuration of an information processing system according to an exemplary embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of several embodiments of the present disclosure with reference to the attached drawings.

System Configuration:

FIG. 1 is a diagram illustrating an example of a system configuration of an information processing system 1 according to an exemplary embodiment of the present disclosure. The information processing system 1 includes a server apparatus 10 that provides an update file 21 for an information processing apparatus 100, and the information processing apparatus 100 that updates a start-up file 121 by using the update file 21.

The server apparatus (first information processing apparatus) 10 is, for example, an information processing apparatus having a configuration of a computer or a system including a plurality of computers. The computer is not limited to a physical machine (computer), and may be a virtual machine on a cloud, for example. The server apparatus 10 generates first signature data 22 used for verifying the update file 21, by executing a predetermined program (for example, a signature generation application) on one or more computers. Further, the server apparatus 10 provides a download file 20 including the update file 21 and the first signature data 22 to the information processing apparatus 100. At this time, the server apparatus 10 generates the first signature data 22 for the update file 21 by using a hash value obtained based on the update file 21.

The update file 21 is a program for updating a start-up file 121 that is a program (software or firmware) read and executed by the information processing apparatus 100 in at the time of boot-up, or start-up. The update file 21 and the start-up file 121 may include, for example, data such as setting data in addition to the program. The first signature data 22 is a digital signature used for confirming that the update file 21 has not been altered, namely falsified, or tempered with.

The information processing apparatus (second information processing apparatus) 100 is, for example, an electronic apparatus such as an image forming apparatus having a configuration of a computer, or a general-purpose information processing apparatus such as a personal computer (PC), a tablet terminal, and a smartphone. Note that the electronic apparatus is not limited to an image forming apparatus, and may be, for example, a projector (PJ), an interactive white board (IWB) that is an electronic whiteboard having mutual communication capability, an output device such as a digital signage, or a head up display (HUD) apparatus. The electronic apparatus may be, for example, an industrial machine, an imaging device, a sound collecting device, a medical device, a network home appliance, a connected car, a game machine, a personal digital assistant (PDA), a digital camera, or a wearable terminal.

In the following description of embodiments, the information processing apparatus 100 is an image forming apparatus such as a multifunction peripheral (MFP) including a single housing with a scan function, a copy function, a print function, and a facsimile communication (FAX) function.

The information processing apparatus 100 obtains the download file 20 provided by the server apparatus 10 and stores the download file 20 in a temporary storage area 110 such as an external memory or a storage device included in the information processing apparatus 100, for example. For example, the information processing apparatus 100 may download the download file 20 from the server apparatus 10 via a communication network 2 and store the download file 20 in the temporary storage area 110. Alternatively, the information processing apparatus 100 may obtain the download file 20 downloaded by another information processing apparatus, via the other information processing apparatus. For example, the information processing apparatus 100 may use, as the temporary storage area 110, an external memory in which the download file 20 is stored by another information processing apparatus.

When updating the start-up file 121, the information processing apparatus 100 verifies the update file 21 with the first signature data 22. If the verification is successful, the information processing apparatus 100 updates the start-up file 121 stored in a storage unit 120 with the update file 21. Accordingly, the information processing apparatus 100 can guarantee that the update file 21 used for updating the start-up file 121 has not been altered, namely falsified, or tempered with (integrity or authenticity).

At this time, the information processing apparatus 100 generates verification data used for verifying the updated start-up file 121 and stores the verification data in a metadata area of the start-up file 121. The information processing apparatus 100 verifies the updated start-up file 121 with the verification data stored in the metadata area in at the time of boot-up with the updated start-up file 121, and gives access to the updated start-up file 121 when the verification is successful. Thus, the information processing apparatus 100 can guarantee that the updated start-up file 121 has not been altered, namely falsified, or tempered with (integrity or authenticity).

In a related art, signature data such as Linux-Integrity Measurement Architecture (Linux-IMA) is used to verify that the updated start-up file 121 has not been altered, namely falsified, or tempered with. In this method, when a part of data of the updated start-up file 121 is damaged due to, for example, an unexpected error, signature data is generated based on the damaged start-up file 121. Accordingly, the damaged start-up file 121 is not correctly verified.

In addition, in a related art, after the updated start-up file 121 is stored in the storage unit 120, a hash calculation is performed on the updated start-up file 121 to generate signature data or the like, and processing time for the hash calculation occurs.

To cope with the above-described matter, the information processing apparatus 100 according to the present embodiment obtains a hash value calculated by the server apparatus based on the first signature data 22 included in the download file 20, and generates based on the obtained hash value the verification data for verifying the updated start-up file 121. As a result, the information processing apparatus 100 according to the present embodiment can correctly verify the updated start-up file 121 using the verification data based on the hash value calculated by the server apparatus 10, even when a part of the data of the updated start-up file 121 is damaged. In addition, the information processing apparatus 100 generates the verification data without performing the hash calculation on the updated start-up file 121, and this reduces processing time for the hash calculation.

As described above, according to the present embodiment, in the information processing system 1 in which a start-up file for the information processing apparatus 100 is updated by using an update file, the updated start-up file can be more correctly verified.

The system configuration of the information processing system 1 illustrated in FIG. 1 is an example. For example, the server apparatus 10 and the information processing apparatus 100 may not be connected via the communication network 2. More specifically, the information processing apparatus 100 may obtain, via an external memory, the download file 20 downloaded from the server apparatus 10 into another information processing apparatus.

Figure 2:
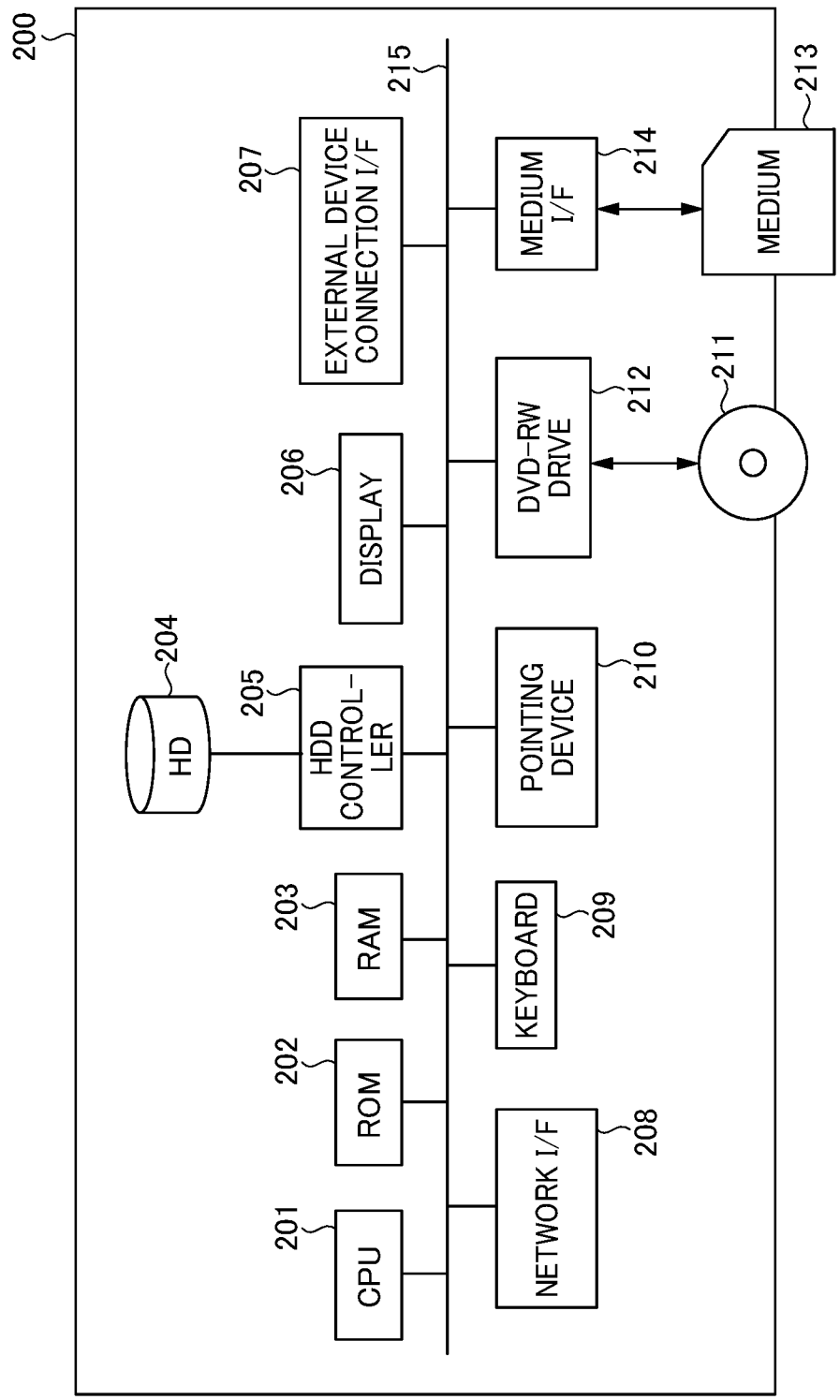
FIG. 2 is a block diagram illustrating an example of a hardware configuration of a computer according to the exemplary embodiment of the present disclosure.

Hardware Configuration:

The server apparatus 10 has a hardware configuration of a computer 200 as illustrated in FIG. 2, for example. Alternatively, the server apparatus 10 includes a plurality of computers each of which is corresponding to the computer 200.

FIG. 2 is a block diagram illustrating an example of a hardware configuration of a computer 200 according to the present embodiment. The computer 200 includes, for example, as illustrated in FIG. 2, a central processing unit (CPU) 201, a read only memory (ROM) 202, a random access memory (RAM) 203, a hard disk (HD) 204, a hard disk drive (HDD) controller 205, a display 206, an external device connection interface (I/F) 207, a network I/F 208, a keyboard 209, a pointing device 210, a digital versatile disk rewritable (DVD-RW) drive 212, a medium I/F 214, and a bus line 215.

The CPU 201 controls entire operation of the computer 200. The ROM 202 stores, for example, a program used to boot or start the computer 200, such as a start-up file. The RAM 203 is used as, for example, a work area for the CPU 201. The HD 204 stores, for example, programs such as an operating system (OS), an application, and a device driver, and various data. The HDD controller 205 controls, for example, reading and writing of various data from and to the HD 204 under control of the CPU 201.

The display 206 displays various information such as a cursor, a menu, a window, a character, or an image. Note that the display 206 may be provided outside the computer 200. The external device connection I/F 207 is an interface for connecting various external devices including an external memory to the computer 200. The network I/F 208 is an interface for performing data communications using the communication network 2, for example.

The keyboard 209 is an example of an input device provided with a plurality of keys for allowing a user to input characters, numerals, or various instructions. The pointing device 210 is an example of an input device that allows a user to select or execute a specific instruction, select processing to be executed, or move a cursor being displayed. Note that the keyboard 209 and the pointing device 210 may be provided outside the computer 200.

The DVD-RW drive 212 reads and writes various data from and to a DVD-RW 211, which is an example of a removable recording medium. The DVD-RW 211 is not limited to the DVD-RW and may be another removable recording medium. The medium I/F 214 controls reading or writing (storing) of data to a storage medium 213 such as a flash memory. The bus line 215 includes an address bus, a data bus, various control signals, and the like for electrically connecting each of above components.

The configuration of the computer 200 illustrated in FIG. 2 is an example. As long as the computer 200 includes, for example, the CPU 201, the ROM 202, the RAM 203, and the network I/F 208, the other part of the configuration may be different.

Hardware Configuration of Image Forming Apparatus:

A hardware configuration of an image forming apparatus 300 that is an example of the information processing apparatus 100 is described below. Note that the information processing apparatus 100 may have the hardware configuration of the computer 200 as illustrated in FIG. 2.

Figure 3:
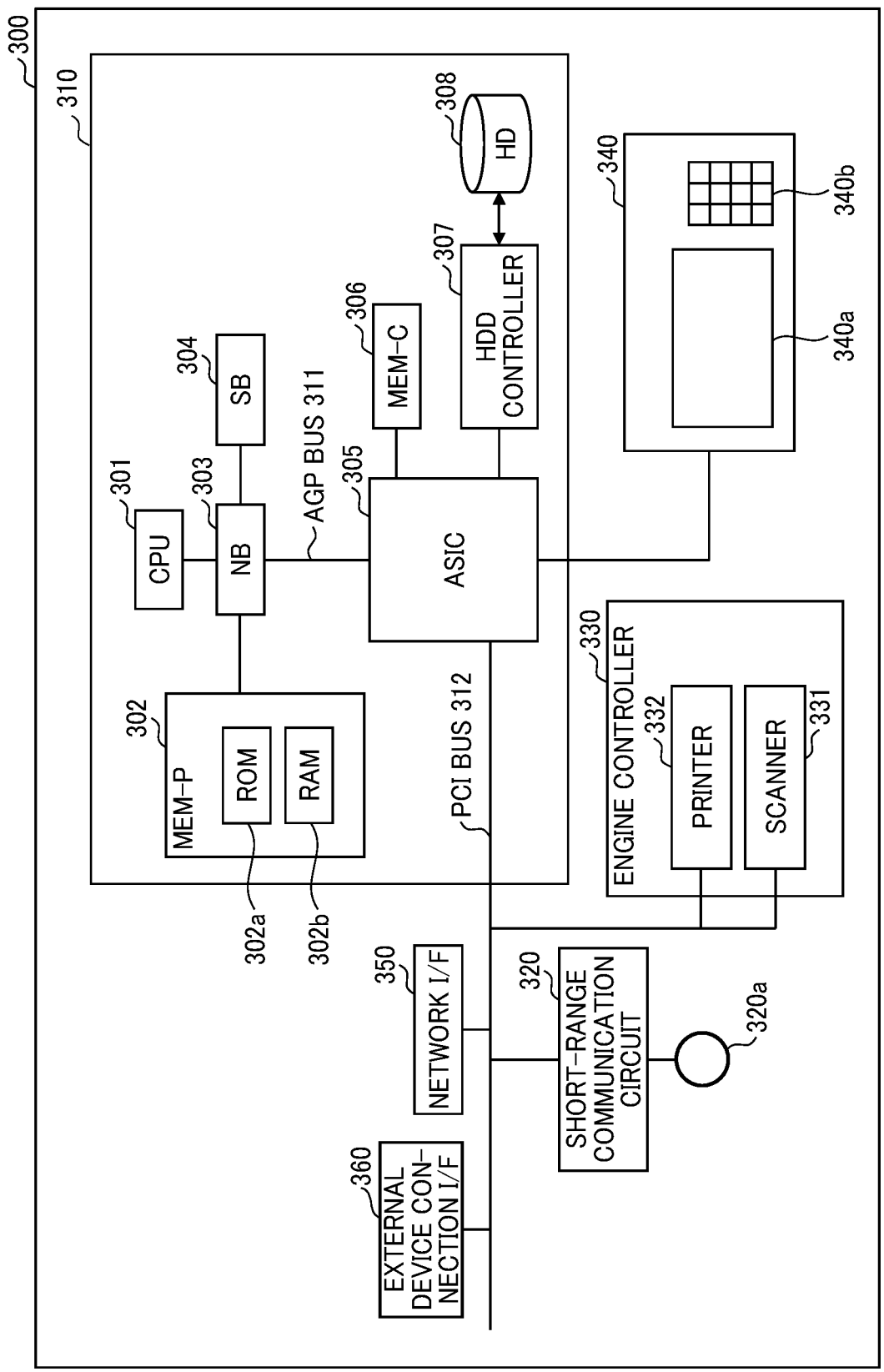
FIG. 3 is a block diagram illustrating an example of a hardware configuration of an image forming apparatus according to the exemplary embodiment of the present disclosure.

FIG. 3 is a block diagram illustrating an example of a hardware configuration of an image forming apparatus according to the present embodiment. The image forming apparatus 300 includes, as illustrated in FIG. 3, for example, a controller 310, a short-range communication circuit 320, an engine controller 330, a control panel 340, a network I/F 350, and an external device connection I/F 360.

The controller 310 includes a CPU 301 as a main processor, a system memory (MEM-P) 302, a north bridge (NB) 303, a south bridge (SB) 304, an application specific integrated circuit (ASIC) 305, a local memory (MEM-C) 306 as a storage unit, an HDD controller 307, and an HD 308 as a storage unit. The NB 303 and the ASIC 305 are connected through an accelerated graphics port (AGP) bus 311.

The CPU 301 is a controller that controls overall operation of the image forming apparatus 300. The NB 303 connects the CPU 301 with the MEM-P 302, the SB 304, and the AGP bus 311. The NB 303 includes a memory controller for controlling reading or writing of various data with respect to the MEM-P 302, a peripheral component interconnect (PCI) master, and an AGP target.

The MEM-P 302 includes a ROM 302a as a memory that stores program or data for implementing various functions of the controller 310. The MEM-P 302 further includes a RAM 302b as a memory that loads the program or data, or as a drawing memory that stores drawing data for printing. The program stored in the RAM 302b may be stored in any computer-readable storage medium, such as a compact disc-read only memory (CD-ROM), compact disc-recordable (CD-R), or digital versatile disc (DVD), in a file format installable or executable by the computer for distribution. The ROM 301a is an example of a storage area for start-up and stores the start-up file 121.

The SB 304 connects the NB 303 with a PCI device or a peripheral device. The ASIC 305 is an integrated circuit (IC) dedicated to an image processing use, and connects the AGP bus 311, a PCI bus 312, the HDD controller 307, and the MEM-C 306. The ASIC 305 includes a PCI target, an AGP master, an arbiter (ARB) as a central processor of the ASIC 305, a memory controller for controlling the MEM-C 306, a plurality of direct memory access controllers (DMACs) capable of converting coordinates of image data with a hardware logic, and a PCI unit that transfers data between a scanner 331 and a printer 332 through the PCI bus 312. The ASIC 305 may be connected to a universal serial bus (USB) interface or an Institute of Electrical and Electronics Engineers (IEEE) 1394 interface.

The MEM-C 306 is a local memory used as a buffer for image data to be copied or a code buffer. The HD 308 stores various image data, font data for printing, and form data. The HD 308 may store programs including an OS, applications, and drivers, or various types of data.

The HDD controller 307 controls reading from or writing to the CPU 301 according to the control of the HD 308. The AGP bus 311 is a bus interface for a graphics accelerator card, which has been proposed to accelerate graphics processing. Through directly accessing the MEM-P 302 by high-throughput, speed of the graphics accelerator card is improved.

The short-range communication circuit 320 performs various short-range wireless communication using an antenna 320a or the like for the short-range communication circuit. The engine controller 330 includes, for example, a scanner 331 and a printer 332. The scanner 331 is a reading device that scans a document. The printer 332 is a printing device that performs printing based on print data. The scanner 331 and the printer 332 each performs various image processing, such as error diffusion or gamma conversion.

The control panel 340 includes a display panel 340a and an operation panel 340b. The display panel 340a is implemented by, for example, a touch panel that displays current settings or a selection screen and receives a user input. The operation panel 340b includes a numeric keypad that receives set values of various image forming parameters such as image density parameter and a start key that accepts an instruction for starting copying. The controller 310 controls overall operation of the image forming apparatus 300. For example, the controller 310 controls drawing, communication, or inputs with respect to the control panel 340.

In response to an instruction to select a specific application through the control panel 340, for example, using a mode switch key, the image forming apparatus 300 selectively performs a document box function, a copy function, a print function, and a facsimile function. The document box mode is selected when the document box function is selected, the copy mode is selected when the copy function is selected, the printer mode is selected when the printer function is selected, and the facsimile mode is selected when the facsimile mode is selected.

The network I/F 350 is an interface for performing data communications using the communication network 2. The external device connection I/F 360 is an interface for connecting various external devices such as an external memory to the image forming apparatus 300. The short-range communication circuit 320, the network I/F 350, and the external device connection I/F 360 are electrically connected to the ASIC 305 through, for example, the PCI bus 312.

The hardware configuration of the image forming apparatus 300 illustrated in FIG. 3 is an example of the hardware configuration of the information processing apparatus 100. As long as the information processing apparatus 100 includes, for example, the CPU 301, the ROM 302a, the RAM 302b, the network I/F 208, and the external device connection I/F 360, the other part of the configuration may be different.

Figure 4:
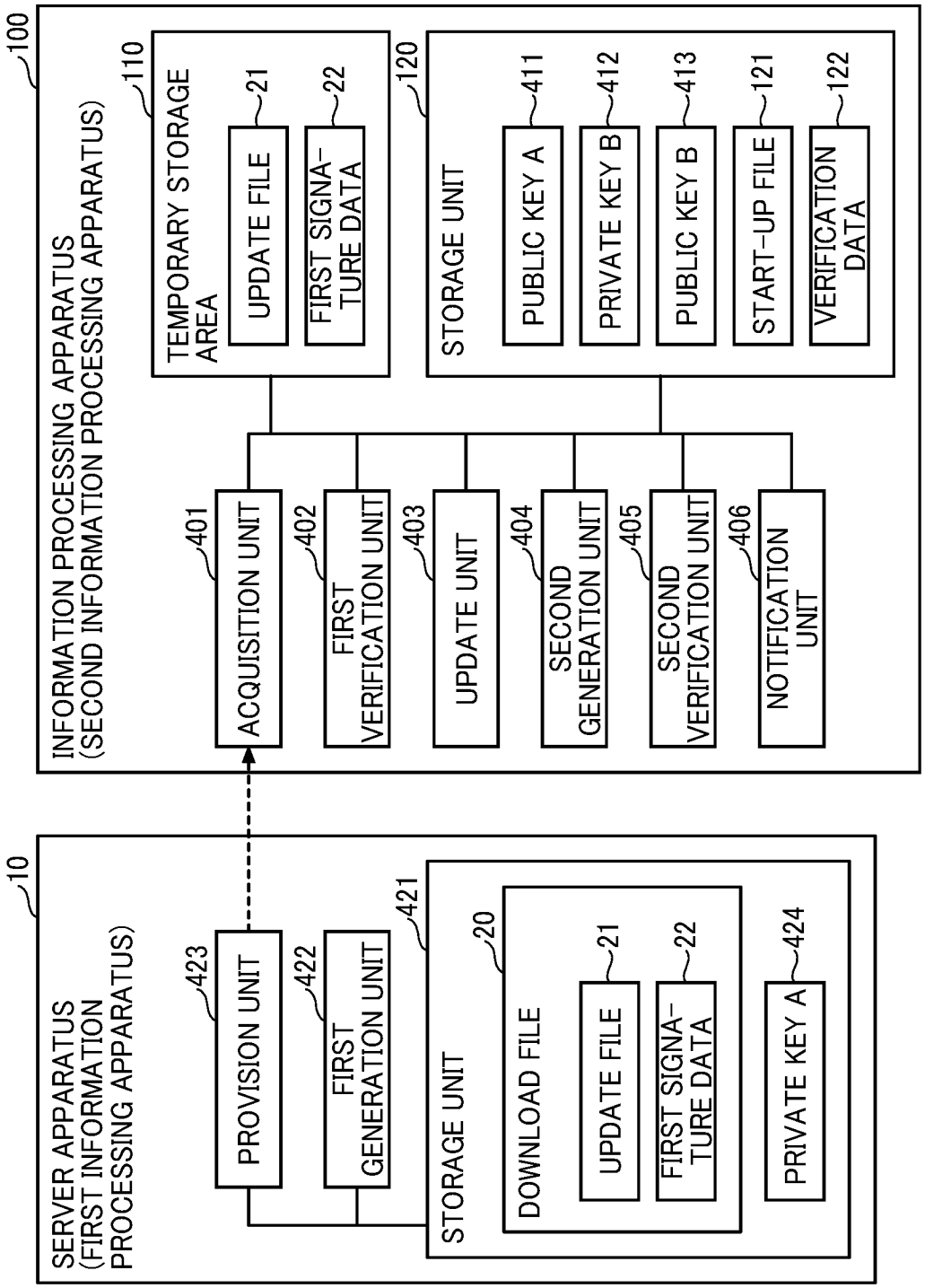
FIG. 4 is a diagram illustrating an example of a functional configuration of the information processing system according to the exemplary embodiment of the present disclosure.

Functional Configuration:

A description is given below of a functional configuration of the information processing system 1. FIG. 4 is a block diagram illustrating an example of a functional configuration of the information processing system 1 according to the present embodiment.

Functional Configuration of Server Apparatus:

The server apparatus (first information processing apparatus) 10 includes, for example, a storage unit 421, a first generation unit 422, and a provision unit 423.

The storage unit 421 is implemented by, for example, a program executed by the CPU 201, and the HD 204, or the HDD controller 205, and stores, for example, the download file 20 and a private key A 424. The information processing system 1 generates a combination of a private key A and a public key A for public key encryption, stores the private key A in the storage unit 421 of the server apparatus 10 in advance, and stores the public key A in the storage unit 120 of the information processing apparatus 100 in advance.

The first generation unit 422 is implemented by, for example, a program (for example, a signature generation application) executed by the CPU 201, and performs first generation processing for generating the first signature data 22 for verifying the update file 21. The first generation unit 422 generates the download file 20 including the update file 21 and the first signature data 22, and stores the download file 20 in the storage unit 421.

The provision unit 423 is implemented by, for example, a program (for example, a signature generation application) executed by the CPU 201, and performs providing processing for providing the download file 20 generated by the first generation unit 422. For example, the server apparatus 10 may provide the download file 20 to the information processing apparatus 100 in response to a download request from the information processing apparatus 100. Alternatively, in response to a request from another information processing apparatus that is different from the information processing apparatus 100, the server apparatus may provide the download file 20 to the other information processing apparatus. In this case, according to a user operation, the download file 20 downloaded from the server apparatus 10 into the other information processing apparatus is stored in an external memory, and the external memory is connected to the information processing apparatus 100.

Functional Configuration of Information Processing Apparatus:

The information processing apparatus 100 includes, for example, an acquisition unit 401, a first verification unit 402, an update unit 403, a second generation unit 404, a second verification unit 405, a notification unit 406, the temporary storage area 110, and the storage unit 120.

The acquisition unit 401 is implemented by, for example, a program (for example, a system update application) executed by the CPU 301, and performs acquisition processing for acquiring, or obtaining, the download file 20 including the update file 21 and the first signature data 22. For example, the acquisition unit 401 may obtain the download file 20 provided by the server apparatus 10 via an external memory, or may obtain the download file provided by the server apparatus 10 via the communication network 2.

The first verification unit 402 is implemented by, for example, a program (for example, a system update application) executed by the CPU 301. When the start-up file 121 is updated with the update file 21, the first verification unit 402 performs first verification processing for verifying the update file 21 by using the first signature data 22. For example, the first verification unit 402 decrypts the first signature data 22 with the public key A to obtain a first hash value, and performs a hash calculation on the update file 21 to obtain a second hash value. In addition, the first verification unit 402 compares the first hash value with the second hash value and determines that the update file 21 is a valid file (which has not been altered) when the first hash value and the second hash value match. On the other hand, the first verification unit 402 compares the first hash value with the second hash value and determines that the update file 21 is an invalid file, or a malicious file, (which has been altered) when the first hash value and the second hash value do not match.

As described above, the information processing system 1 generates a combination of the private key A and the public key A for the public key encryption, stores the private key A in the storage unit 421 of the server apparatus 10 in advance, and stores the public key A in the storage unit 120 of the information processing apparatus 100 in advance.

The update unit 403 is implemented by, for example, a program (for example, a system update application) executed by the CPU 301, and performs update processing for updating the start-up file 121 for the information processing apparatus 100 with the update file 21 verified by the first verification unit 402. For example, the update unit 403 overwrites the start-up file 121 in the storage unit 120 with the update file 21 that is determined as a valid file by the first verification unit 402.

The second generation unit 404 is implemented by, for example, a program (for example, a system update application) executed by the CPU 301. The second generation unit 404 performs second generation processing for generating verification data 122 for verifying the start-up file 121 that is updated by the update unit 403, based on the first hash value obtained based on the first signature data 22, for example. For example, the second generation unit 404 uses, as the verification data 122, second signature data generated by encrypting the first hash value obtained based on the first signature data 22 with a private key B for start-up.

In this case, the information processing apparatus 100 stores a combination of the private key B and a public key B for start-up in the storage unit 120 in advance.

For example, the second generation unit 404 may use the first hash value obtained based on the first signature data 22 as the verification data 122.

The second verification unit 405 is implemented by, for example, a program (for example, a system update application) executed by the CPU 301. For example, when the information processing apparatus 100 boots with the start-up file 121 that is updated by the update unit 403, the second verification unit 405 performs second verification processing for verifying the start-up file 12 that is updated by the update unit 403, by using the verification data 122 generated by the second generation unit 404. For example, the second verification unit 405 decrypts the second signature data (an example of verification data) generated by the second generation unit 404 with the public key B to obtain the first hash value, and performs a hash calculation on the updated start-up file 121 to obtain a third hash value. In addition, the second verification unit 405 compares the first hash value with the third hash value, and determines that the updated start-up file 121 is a valid file (which has not been altered) when the first hash value and the third hash value match. In this case, the information processing apparatus 100 loads the updated start-up file 121 into the RAM area and gives access to the start-up file 121.

On the other hand, the second verification unit 405 compares the first hash value with the third hash value and determines that the updated start-up file 121 is an invalid file, or a malicious file, (which has been altered) when the first hash value and the third hash value do not match. In this case, the information processing apparatus 100 cancels loading the updated start-up file 121 into the RAM area or blocks access to the start-up file 121.

The notification unit 406 is implemented by, for example, a program (for example, a system update application) executed by the CPU 301. When the first verification unit 402 determines failure in vilification of the update file 21, the notification unit 406 performs notification processing (first notification processing) for notifying an error. When the second verification unit 405 determines failure in vilification of the start-up file 121, the notification unit 406 performs notification processing (second notification processing) for notifying an error. For example, the notification unit 406 notifies the error by displaying an error notification screen on a display unit such as the control panel 340. For example, the notification unit 406 may notify the error to a predetermined terminal device by e-mail transmission or push notification.

The temporary storage area 110 is implemented by, for example, an external memory connected to the information processing apparatus 100 or a storage device such as the RAM 302b and the HD 308, and temporarily stores the update file 21 and the first signature data 22.

The storage unit 120 is implemented by, for example, a storage device such as the ROM 302a, the RAM 302b, the MEM-C 306, and the HD 308, or a storage area inside the ASIC 305. The storage unit 120 stores, for example, a public key A 411, a private key B 412, a public key B 413, the start-up file 121, and the verification data 122. The storage unit 120 includes, for example, a storage area for start-up and a RAM area.

Process:

A description is given below of a process of an information processing method according to the present embodiment.

First Embodiment

Figure 5:
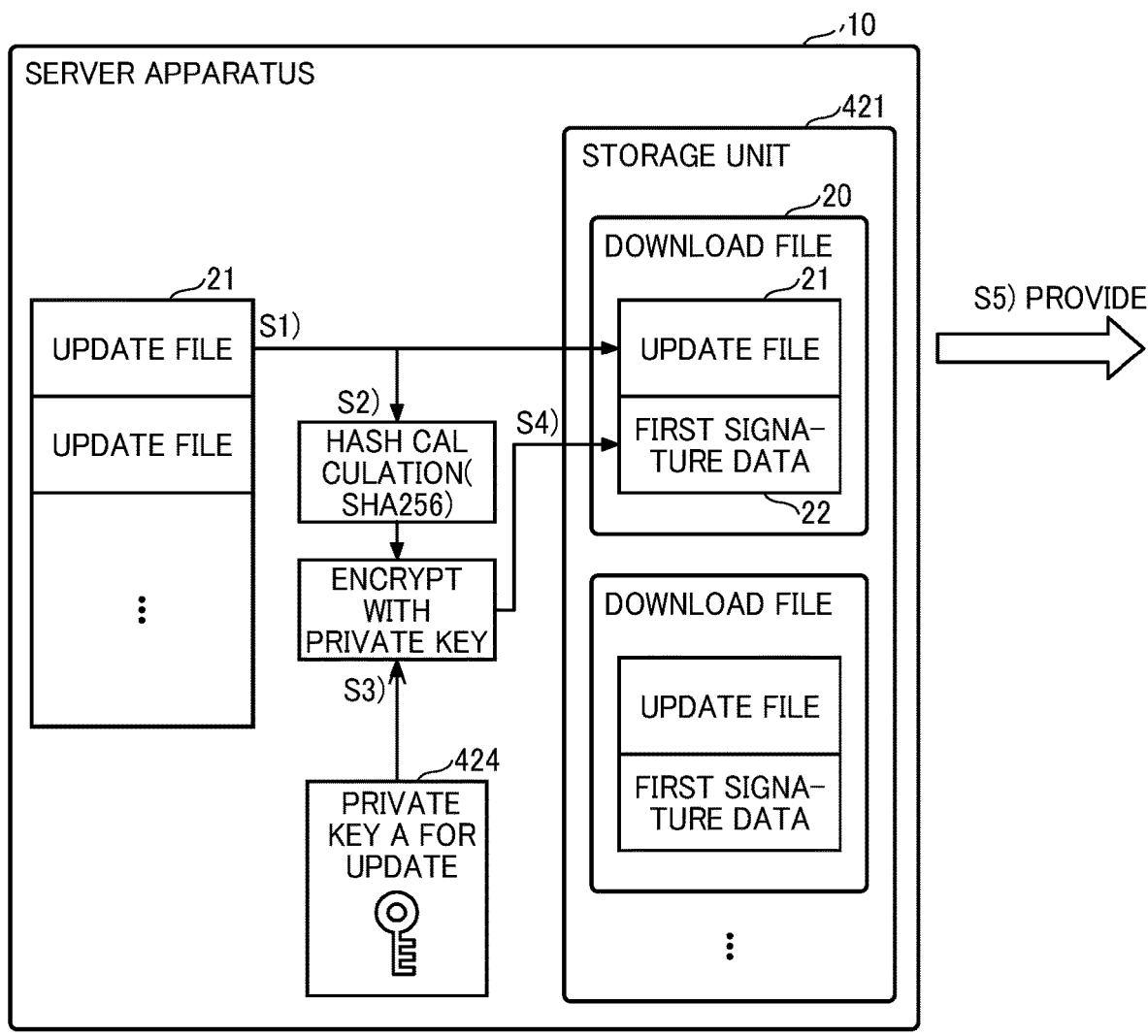
FIG. 5 is a diagram illustrating operation of a server apparatus according to a first embodiment of the present disclosure.

Operation of Server Apparatus:

FIG. 5 is a diagram illustrating operation of the server apparatus 10 according to a first embodiment. In step S1 of FIG. 5, the first generation unit 422 of the server apparatus obtains the update file 21. At this time, the first generation unit 422 may obtain the update file 21 from the storage unit 421 included in the server apparatus 10, or may obtain the update file 21 from another server apparatus outside the information processing system 1.

In step S2, the first generation unit 422 performs a hash calculation on the obtained update file 21 to calculate a first hash value. For example, the first generation unit 422 performs a hash calculation on the update file 21 using a hash function such as Secure Hash Algorithm 256-bit (SHA-256).

In step S3, the first generation unit 422 encrypts the calculated first hash value with a private key A that is for update to generate the first signature data 22. In step S4, the first generation unit 422 generates the download file 20 including the update file 21 and the first signature data 22, and stores the download file 20 in the storage unit 421.

When there are a plurality of update files 21, the first generation unit 422 executes the processing in steps S1 to S4 for each of the plurality of update files to generate a plurality of download files 20.

In step S5, the provision unit 423 of the server apparatus 10 provides one or more downloads stored in the storage unit 421, for example, in response to a request from the information processing apparatus 100.

Figure 6:
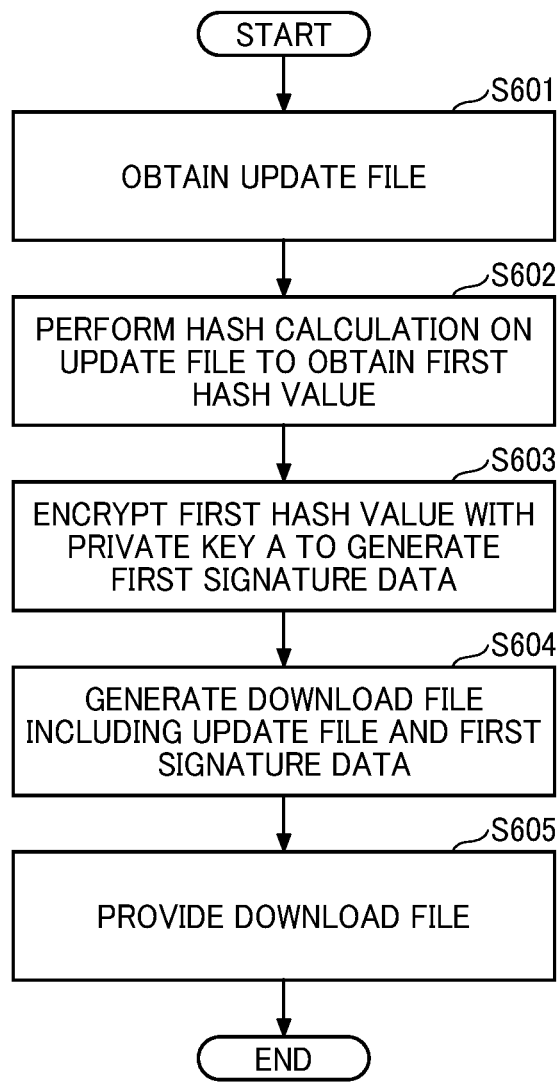
FIG. 6 is a flowchart illustrating an example of a process performed by the server apparatus according to the first embodiment of the present disclosure.

FIG. 6 is a flowchart illustrating a process corresponding to the operation illustrated in FIG. 5.

Process Performed by Server Apparatus:

FIG. 6 is a flowchart illustrating an example of a process performed by the server apparatus 10 according to the first embodiment. The process indicates an example of a process in which the server apparatus 10 generates and provides the download file 20 including the update file 21 and the first signature data 22. Since the process illustrated in FIG. 6 corresponds to the operation described above with reference to FIG. 5, the redundant description is omitted below.

In step S601, the first generation unit 422 of the server apparatus 10 obtains the update file 21.

In step S602, the first generation unit 422 performs the hash calculation on the obtained update file 21 to calculate the first hash value.

In step S603, the first generation unit 422 encrypts the first hash value with the private key A to generate the first signature data.

In step S604, the first generation unit 422 generates the download file 20 including the obtained update file 21 and the generated first signature data 22.

In step S605, the provision unit 423 of the server apparatus 10 provides the download file 20 to, for example, the information processing apparatus 100 or another information processing apparatus.

Figure 7:
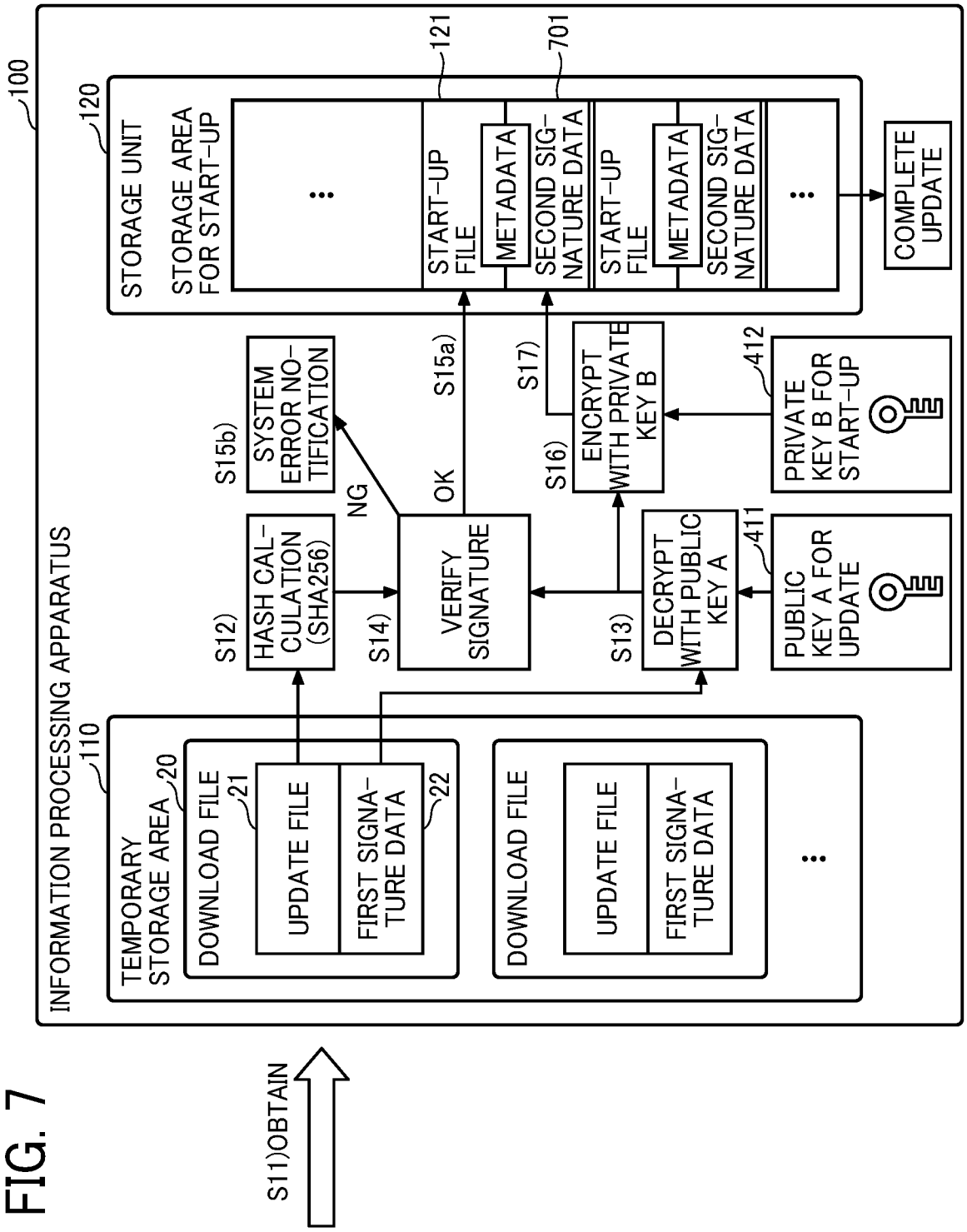
FIG. 7 is a diagram illustrating operation of an information processing apparatus in at the time of update according to the first embodiment of the present disclosure.

Process in at Time of Update:

FIG. 7 is a diagram illustrating operation of the information processing apparatus 100 in at the time of update according to the first embodiment. In step S11 of FIG. 7, the acquisition unit 401 of the information processing apparatus 100 obtains one or more download files 20 provided by the server apparatus 10. For example, the acquisition unit 401 may download the one or more download files 20 from the server apparatus 10 via the communication network 2, and store the download files 20 in the temporary storage area 110. Alternatively, the acquisition unit 401 may obtain the one or more download files 20 from an external memory connected to the information processing apparatus 100. For ease of explanation, in the following description, it is assumed that the number of download files 20 is one.

In step S12, the first verification unit 402 of the information processing apparatus 100 performs a hash calculation on the update file 21 included in the download file 20 obtained by the acquisition unit 401 to obtain a second hash value. For example, the first verification unit 402 performs the hash calculation on the update file 21 using a hash function such as SHA-256.

In step S13, the first verification unit 402 decrypts the first signature data 22 included in the download file 20 obtained by the acquisition unit 401 with the public key A 411 that is for update, and obtains the first hash value.

In step S14, the first verification unit 402 verifies the first signature data 22.

For example, the first verification unit 402 compares the first hash value with the second hash value, and when the first hash value and the second hash value match, the first verification unit 402 determines that the update file 21 is a valid file that has not been altered. In this case, the update unit 403 of the information processing apparatus 100 updates the start-up file 121 stored in the start-up storage area of the storage unit 120 with the update file 21 determined as a valid file in step S15a, and executes the processing of step S16 and subsequent steps.

On the other hand, the first verification unit 402 compares the first hash value with the second hash value, and when the first hash value and the second hash value do not match, the first verification unit 402 determines that the update file 21 is an invalid file, or a malicious file, that has been falsified (or corrupted or damaged). In this case, the notification unit 406 of the information processing apparatus 100 performs a system error notification, and cancels the processing after step S16.

In step S16, the second generation unit 404 of the information processing apparatus 100 encrypts the first hash value obtained by the first verification unit 402 in step S13 with the private key B 412 that is for start-up to generate a second signature data 701.

In step S17, the second generation unit 404 stores the generated second signature data in the metadata area of the updated start-up file 121 stored in the start-up storage area of the storage unit 120.

Figure 8:
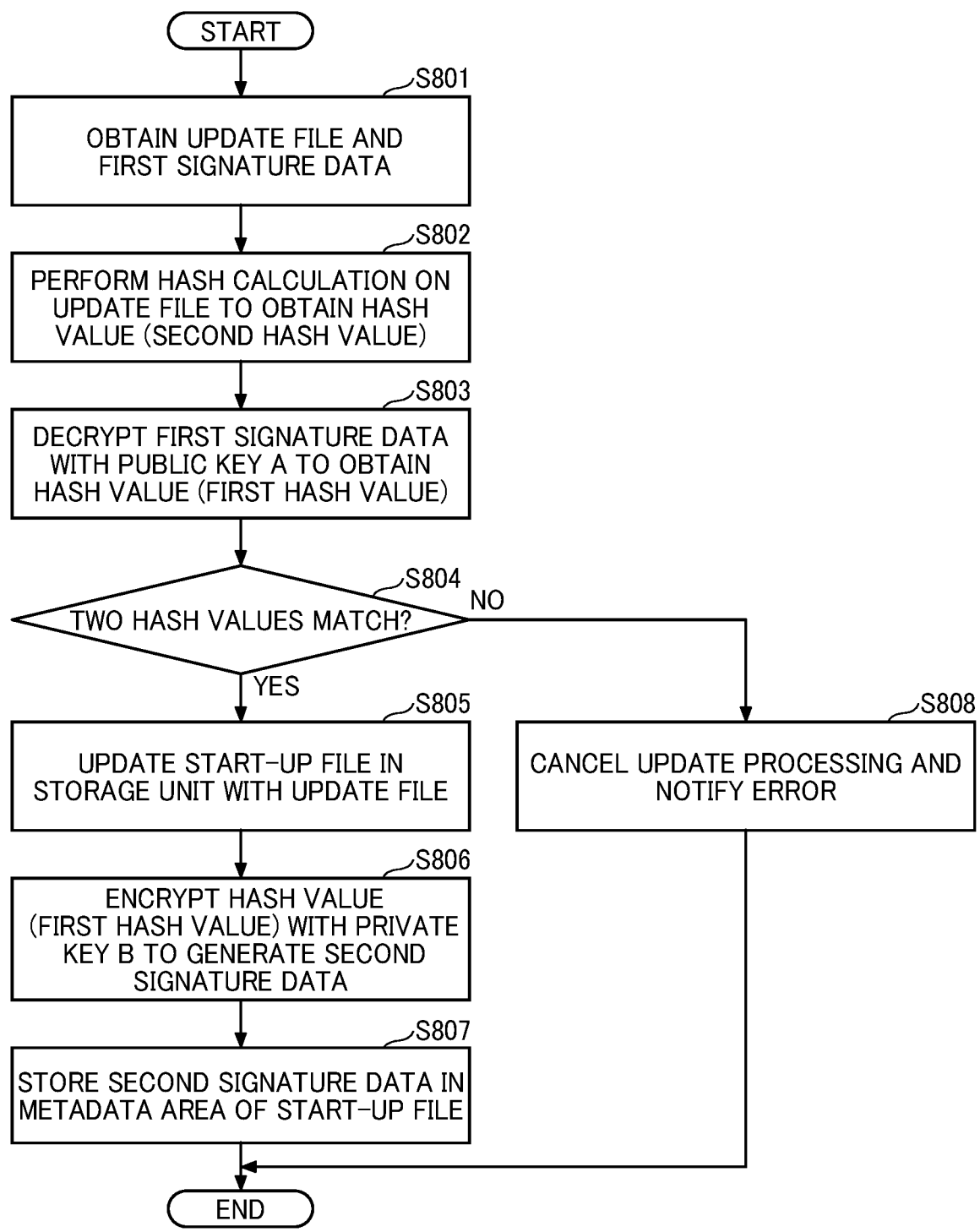
FIG. 8 is a flowchart illustrating an example of a process performed by the information processing apparatus in at the time of update according to the first embodiment of the present disclosure.

When there are a plurality of download files 20, the information processing apparatus 100 executes the processing of steps S12 to S17 for each of the plurality of download files 20. FIG. 8 is a flowchart illustrating a process corresponding to the operation illustrated in FIG. 7.

Process Performed in at Time of Update:

FIG. 8 is a flowchart illustrating an example of a process performed by the information processing apparatus 100 in at the time of update according to the first embodiment. The process is an example of a process performed by the information processing apparatus 100 for updating the start-up file 121 for the information processing apparatus 100 using the download file 20 provided by the server apparatus 10. Since the process illustrated in FIG. 8 corresponds to the operation described above with reference to FIG. 7, the redundant description is omitted below.

In step S801, the acquisition unit 401 of the information processing apparatus 100 obtains the update file 21 and the first signature data 22 included in the download file 20 provided by the server apparatus 10.

In step S802, the first verification unit 402 of the information processing apparatus 100 performs a hash calculation on the update file 21 obtained by the acquisition unit 401 to obtain a hash value (second hash value).

In step S803, the first verification unit 402 decrypts the first signature data 22 obtained by the acquisition unit 401 with the public key A 411, which is for update, stored in advance in the storage unit 120, and obtains the first hash value generated by the server apparatus 10. The processing of step S803 may be executed before the processing of step S802 or may be executed in parallel with the processing of step S802.

In step S804, the first verification unit 402 determines whether the two hash values of the first hash value and the second hash value match. When the two hash values match, the process proceeds to step S805. On the other hand, when the two hash values do not match, the process proceeds to step S808.

In step S805, the update unit 403 of the information processing apparatus 100 determines that the update file 21 obtained by the acquisition unit 401 is a valid file, and updates the start-up file 121 stored in the storage unit 120 with the update file 21.

In step S806, the second generation unit 404 of the information processing apparatus 100 encrypts the first hash value obtained by the first verification unit 402 in step S803 with the private key B 412 that is for start-up to generate the second signature data 701.

In step S807, the second generation unit 404 stores the generated second signature data 701 in the metadata area of the updated start-up file 121. The second signature data 701 is an example of the verification data 122 for verifying the updated start-up file 121. For example, the verification data 122 may be the first hash value as described later in a second embodiment.

Figure 9:
FIG. 9 is a diagram illustrating an example of an error notification screen according to the first embodiment of the present disclosure.

On the other hand, when the process proceeds from step S804 to step S808, the information processing apparatus 100 cancels the update processing, and the notification unit 406 of the information processing apparatus 100 notifies an error. For example, the notification unit 406 displays an error notification screen 900 as illustrated in FIG. 9 on a display unit such as the control panel 340. In the example of FIG. 9, information including a message indicating that the update of the start-up file 121 has failed, an error code, and a contact destination is displayed on the error notification screen 900. As described above, when the verification of the first signature data 22 fails, the information processing apparatus 100 according to the present embodiment can notify error information by displaying on a screen of a display unit such as the control panel 340.

Figure 10:
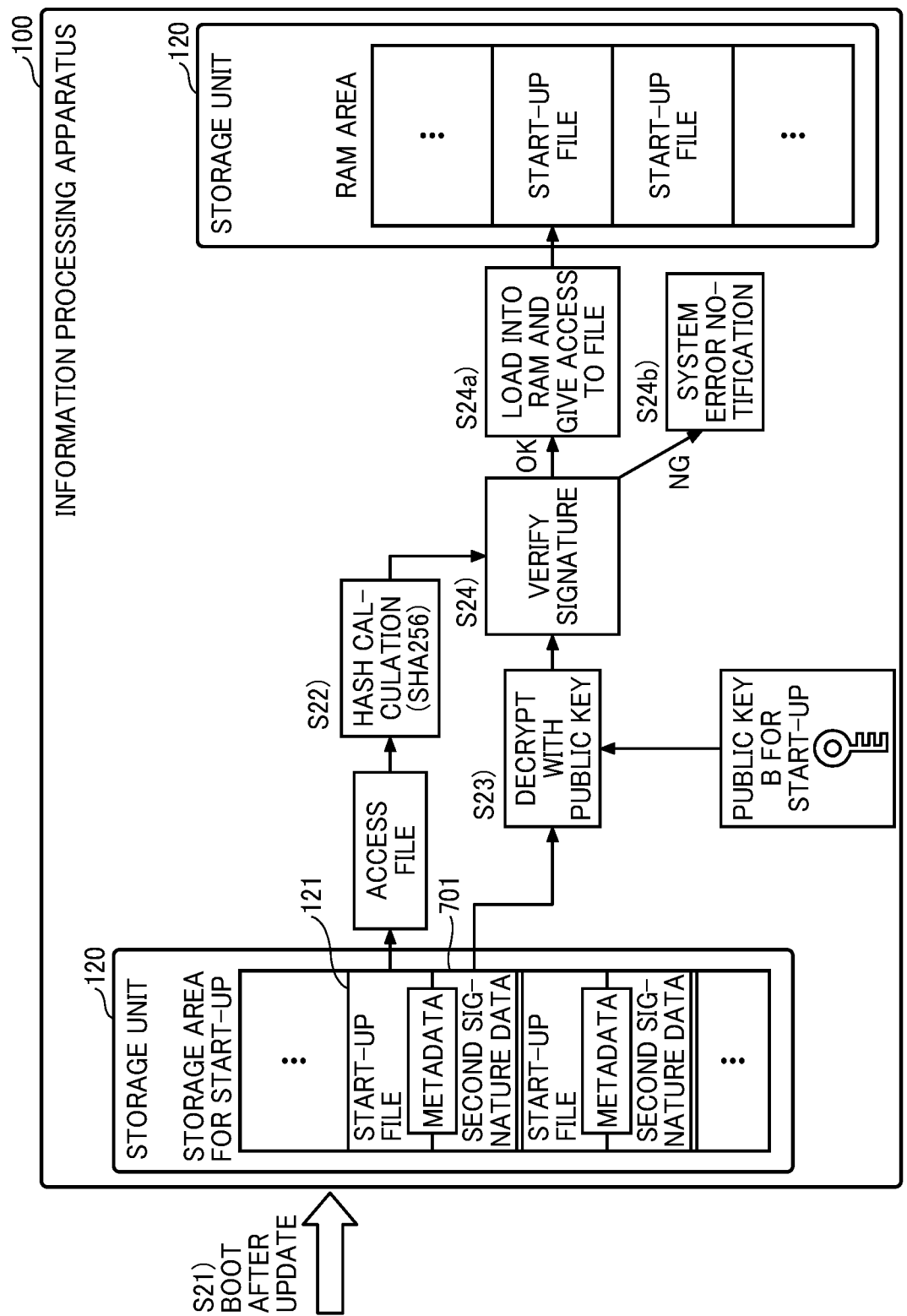
FIG. 10 is a diagram illustrating operation of the information processing apparatus in at the time of boot-up according to the first embodiment of the present disclosure.

Process in at Time of Boot-Up:

FIG. 10 is a diagram illustrating operation of the information processing apparatus 100 in at the time of boot-up according to the first embodiment. In step S21 of FIG. 10, the information processing apparatus 100 boots (or reboots) after updating the start-up file 121 by the process of FIG. 7 or FIG. 8.

In step S22, when the start-up file 121 is accessed, the second verification unit 405 of the information processing apparatus 100 performs a hash calculation on the start-up file 121 to obtain the third hash value.

In step S23, the second verification unit 405 decrypts the second signature data 701 in the metadata area of the start-up file 121 with the public key B that is for start-up to obtain the first hash value.

In step S24, the second verification unit 405 verifies the first signature data 22. For example, the second verification unit 405 compares the first hash value with the third hash value, and determines that the start-up file 121 is a valid file that has not been altered when the first hash value matches the third hash value. In this case, in step S24a, the second verification unit 405 loads the start-up file 121 determined as a valid file into the RAM area of the storage unit 120, and gives access to the start-up file 121.

On the other hand, the second verification unit 405 compares the first hash value with the third hash value, and when the first hash value and the third hash value do not match, determines that the start-up file 121 is an invalid file, or a malicious file, that has been falsified, corrupted, or damaged. In this case, the notification unit 406 of the information processing apparatus 100 performs a system error notification and cancels the processing of step S24a.

Figure 11:
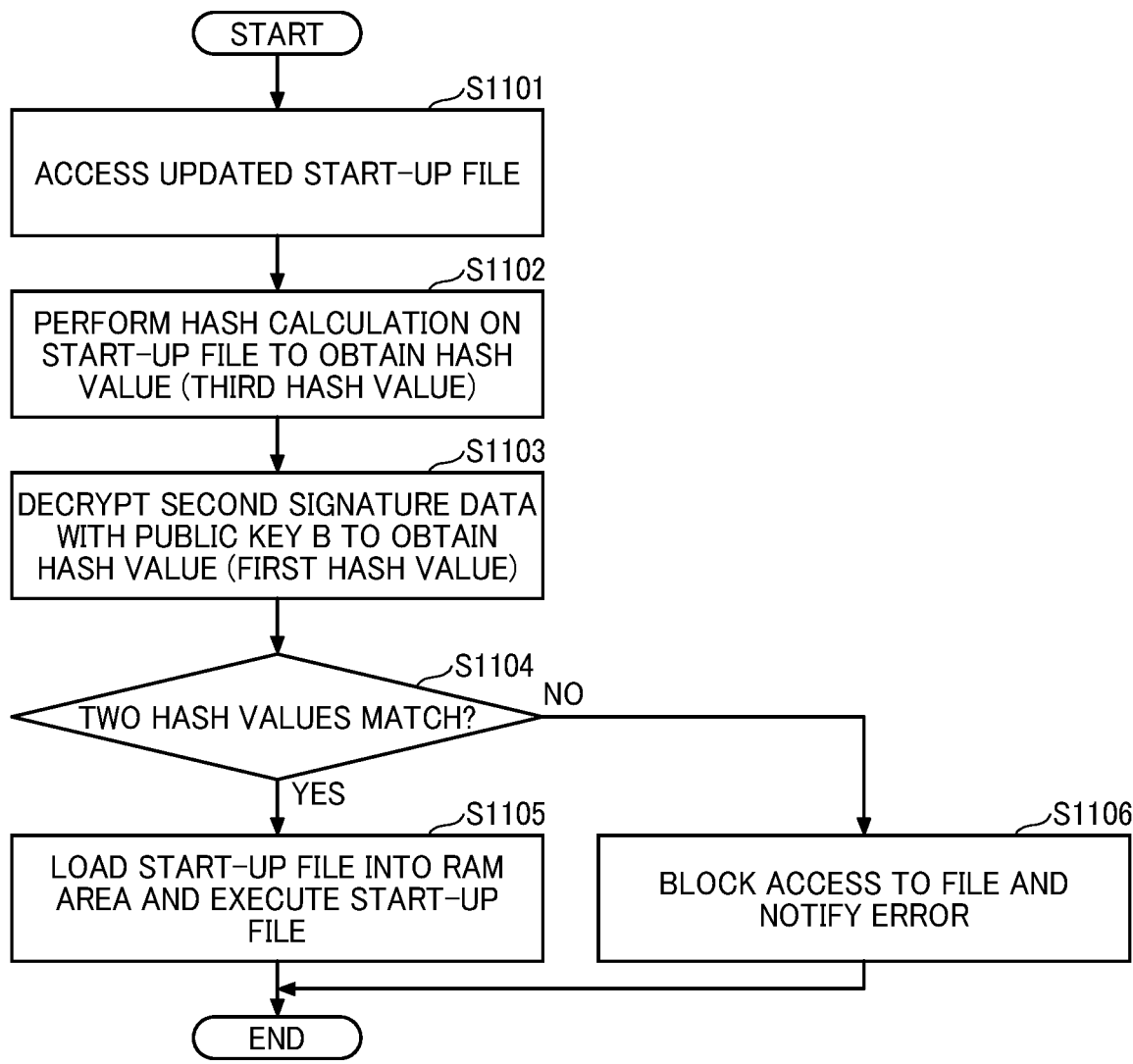
FIG. 11 is a flowchart illustrating an example of a process performed by the information processing apparatus in at the time of boot-up according to the first embodiment of the present disclosure.

FIG. 11 is a flowchart illustrating a process corresponding to the operation illustrated in FIG. 10.

Process Performed in at Time of Boot-up:

FIG. 11 is a flowchart illustrating an example of a process performed by the information processing apparatus 100 in at the time of boot-up according to the first embodiment. The process is an example of a process performed by the information processing apparatus 100 for booting or rebooting after updating the start-up file 121 by the process of FIG. 8, for example. Since the process illustrated in FIG. 11 corresponds to the operation described above with reference to FIG. 10, the redundant description is omitted below.

In step S1101, when the information processing apparatus 100 accesses the updated start-up file 121, the information processing apparatus 100 executes the processing of step S1102 and subsequent steps.

In step S1102, the second verification unit 405 of the information processing apparatus 100 performs a hash calculation on the updated start-up file 121 to obtain a hash value (third hash value).

In step S1103, the second verification unit 405 decrypts the second signature data 701 in the metadata area of the updated start-up file 121 with the start-up public key B to obtain a hash value (first hash value). The processing of step S1103 may be performed before the processing of step S1102 or may be executed in parallel with the processing of step S1102.

In step S1104, the second verification unit 405 determines whether the two hash values of the first hash value and the third hash value match. When the two hash values match, the process proceeds to step S1105. On the other hand, when the two hash values do not match, the process proceeds to step S1106.

In step S1105, the second verification unit 405 loads the start-up file 121 determined as a valid file into the RAM area of the storage unit 120, and gives access to the start-up file 121. Accordingly, the information processing apparatus 100 can execute the start-up file 121.

On the other hand, when the process proceeds to step S1106, the information processing apparatus 100 blocks access to the start-up file 121 determined as an invalid file, or a malicious file, and the notification unit 406 of the information processing apparatus 100 notifies an error. For example, the notification unit 406 displays an error notification screen 1200 as illustrated in FIG. 12 on a display unit such as the control panel 340.

Figure 12:
FIG. 12 is a diagram illustrating another example of an error notification screen according to the first embodiment of the present disclosure.

In the example of FIG. 12, information including a message indicating that the start of the start-up file 121 has failed, an error code, and a contact destination is displayed on the error notification screen 1200. As described above, when the verification of the first signature data 22 fails, the information processing apparatus 100 according to the present embodiment can notify error information by displaying on a screen of a display unit such as the control panel 340.

As described above, the information processing apparatus 100 according to the first embodiment can verify the validity, or integrity, of the updated start-up file 121 by using first hash data calculated by the server apparatus 10, in at the time of boot-up after updating the start-up file 121.

Second Embodiment

In the example of the process according to the first embodiment described above, the verification data 122 for verifying the updated start-up file 121 is the second signature data. However, this is an example, and the verification data 122 for verifying the updated start-up file 121 may be the first hash value. In the following description of the second embodiment, an example of a process in which the verification data 122 for verifying the updated start-up file 121 is the first hash value is given.

Figure 13:
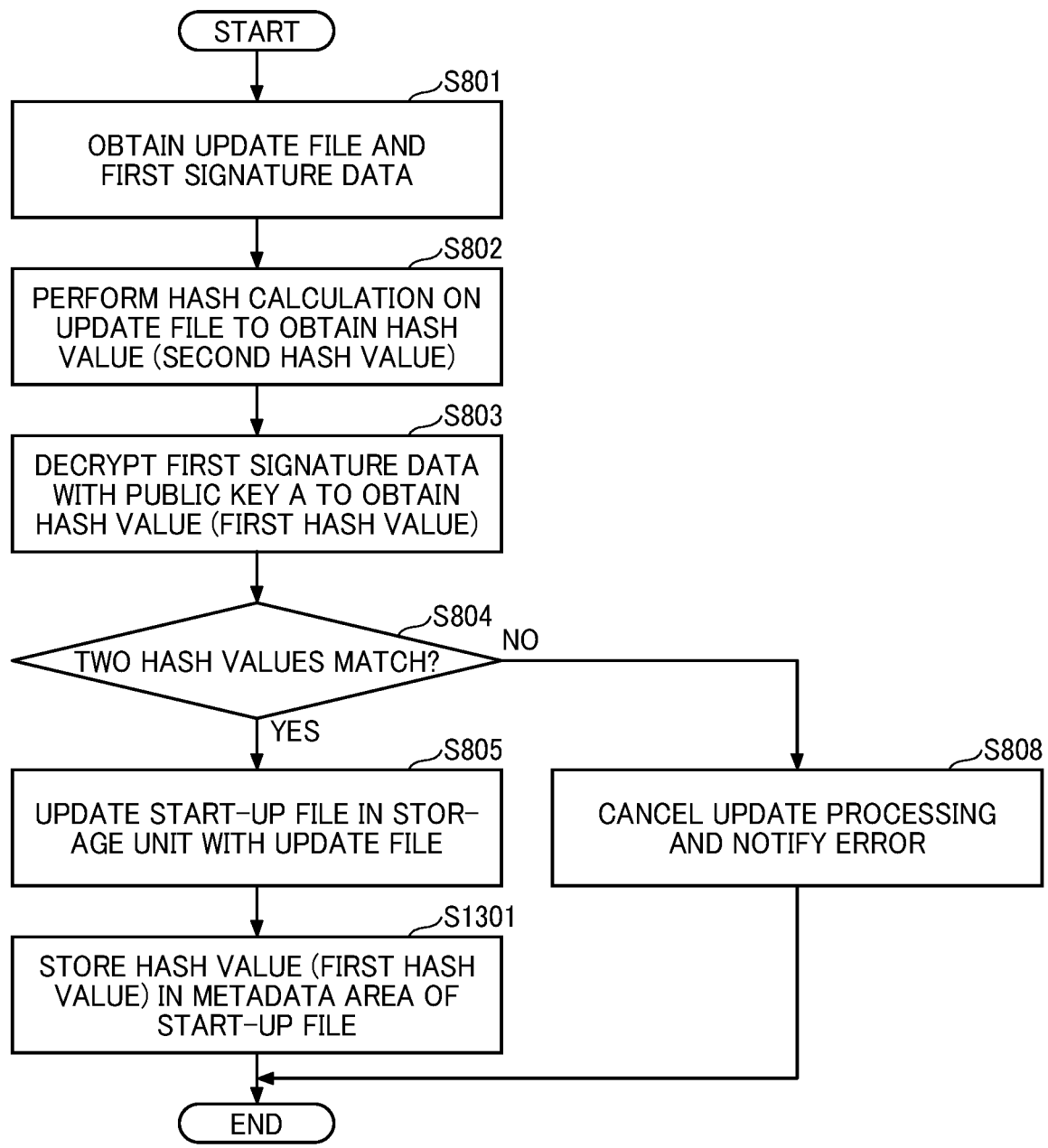
FIG. 13 is a flowchart illustrating an example of a process performed in at the time of update by the information processing apparatus according to a second embodiment of the present disclosure.

Process Performed in at Time of Update:

FIG. 13 is a flowchart illustrating an example of a process performed by the information processing apparatus 100 in at the time of update according to the second embodiment. The process is another example of a process performed by the information processing apparatus 100 for updating the start-up file 121 for the information processing apparatus 100 using the download file 20 provided by the server apparatus 10. Among the steps illustrated in FIG. 13, the processing of steps S801 to S805 and S808 are substantially the same as that in the process in at the time of update according to the first embodiment illustrated in FIG. 8. Accordingly, the following description focuses on differences from the first embodiment.

In step S1301 of FIG. 13, the second generation unit 404 of the information processing apparatus 100 stores the first hash value obtained by the first verification unit 402 in the metadata area of the updated start-up file 121 as the verification data 122. The first hash value is another example of the verification data 122 for verifying the updated start-up file 121.

Figure 14:
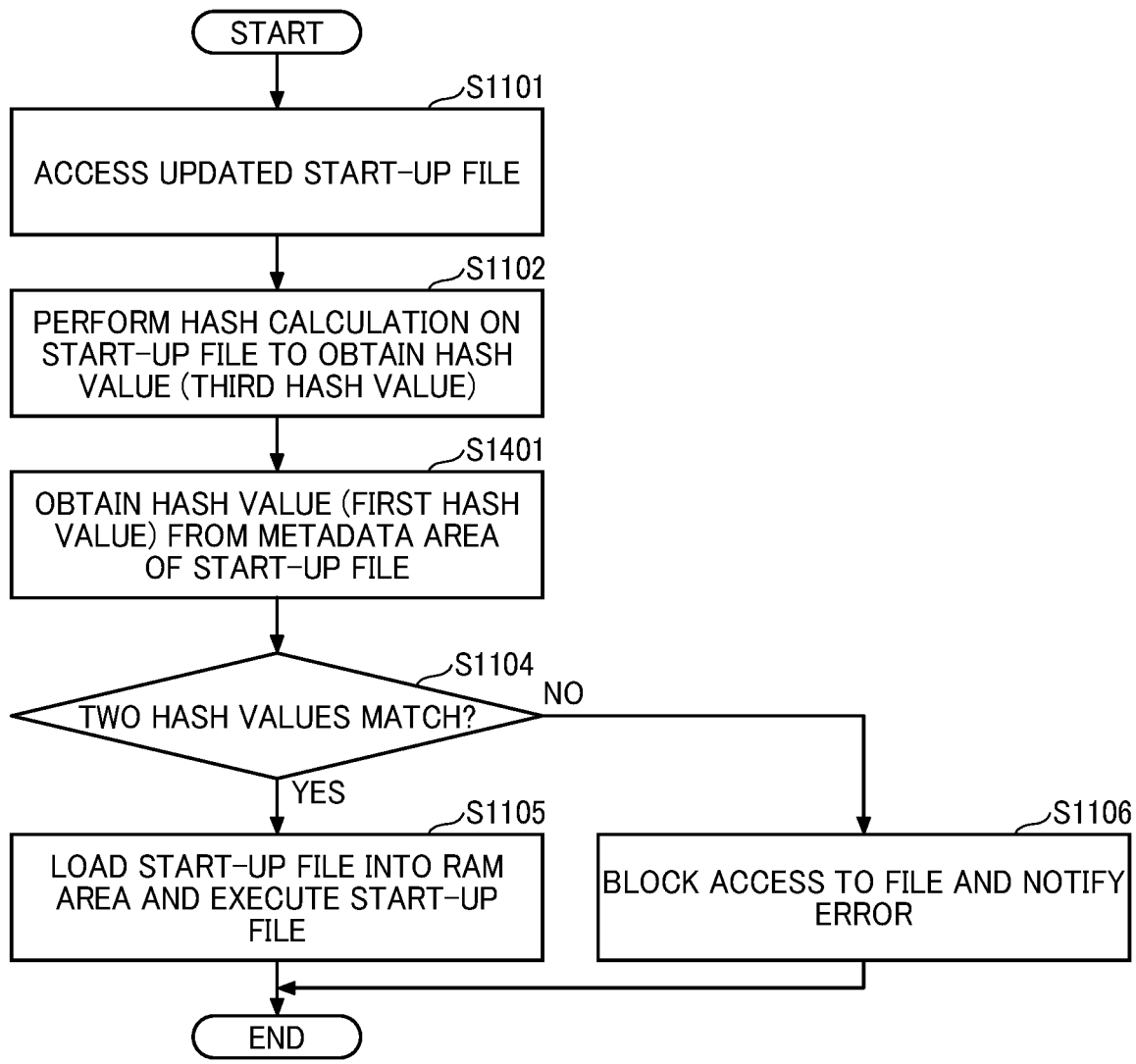
FIG. 14 is a flowchart illustrating an example of a process performed by the information processing apparatus in at the time of boot-up according to the second embodiment of the present disclosure.

Process Performed in at Time of Boot-Up:

FIG. 14 is a flowchart illustrating an example of a process performed by the information processing apparatus 100 in at the time of boot-up according to the second embodiment. The process is another example of a process performed by the information processing apparatus 100 for booting or rebooting after updating the start-up file 121 by the process of FIG. 13, for example. Among the steps illustrated in FIG. 14, the processing of steps S1101, S1102, and S1104 to S1106 are substantially the same as that in the process in at the time of boot-up according to the first embodiment illustrated in FIG. 11. Accordingly, the following description focuses on differences from the first embodiment.

In step S1401 of FIG. 14, the second verification unit 405 of the information processing apparatus 100 obtains the first hash value stored as the verification data 122 in the metadata area of the updated start-up file 121. The second verification unit 405 verifies the validity, or integrity, of the start-up file 121 by using the obtained first hash value.

As described above, the verification data 122 for verifying the start-up file 121 is not limited to the second signature data 701, and may be the first hash data, for example. As described above, the information processing apparatus 100 according to the second embodiment can also verify the validity, or integrity, of the updated start-up file 121 by using the first hash data calculated by the server apparatus 10, in at the time of boot-up after updating the start-up file 121.

As described above, according to the present embodiment, in the information processing system 1 that updates the start-up file 121 for the information processing apparatus 100 using the update file 21, the updated start-up file 121 can be more correctly verified.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The apparatuses or devices described in the above-described embodiments are merely examples of plural computing environments that implement the above-described embodiments disclosed herein. In some embodiments, the server apparatus 10 includes multiple computing devices such as server clusters.

The plurality of computing devices is configured to communicate with one another via any type of communication link, including a network or shared memory to implement the processing described in the present embodiment.

The server apparatus 10 may be integrated into one apparatus or may be divided into a plurality of apparatuses. In addition, at least a part of the functional configuration of the server apparatus 10 and the information processing apparatus 100 may be executed using an external cloud service, for example.

In a related art, in a case where a part of the updated file for boot-up, or start-up, written in a storage device is damaged due to an unexpected error, signature data for verification is generated based on the damaged file for boot-up, or start-up, and the file for boot-up, or start-up, is not correctly verified.

According to an embodiment of the present disclosure, in an information processing system in which a start-up file for an information processing apparatus is updated by using an update file, the updated start-up file can be verified correctly.

An embodiment of the present disclosure includes a non-transitory recording medium storing a plurality of instructions which, when executed by one or more processors of an information processing apparatus, causes the processors to perform a method. The method includes obtaining an update file and signature data. The update file is for updating a start-up file for the information processing apparatus. The signature data is for verifying the update file. The update file and the signature data are generated by another information processing apparatus. The method includes verifying the update file with the signature data in updating the start-up file with the update file, updating the start-up file with the verified update file, generating, based on a hash value obtained based on the signature data, verification data for verifying the updated start-up file, and verifying the updated start-up file with the verification data in starting up the information processing apparatus with the updated start-up file.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An information processing system, comprising:
a first information processing apparatus; and
a second information processing apparatus,
the first information processing apparatus including first circuitry configured to:
generate signature data for an update file based on a hash value obtained based on the update file; and
provide the update file,
the second information processing apparatus including second circuitry configured to:

obtain the update file and the signature data;

verify the update file with the signature data in updating a start-up file for the second information processing apparatus with the update file;

update the start-up file with the verified update file;

generate, based on the hash value obtained based on the signature data, verification data for verifying the updated start-up file, wherein the hash value is calculated by said first information processing apparatus; and verify the updated start-up file with the verification data in starting up the second information processing apparatus with the updated start-up file.

2. The information processing system of claim 1, wherein the verification data includes additional signature data generated based on the hash value obtained based on the signature data.

3. The information processing system of claim 1, wherein the verification data includes the hash value obtained based on the signature data.

4. The information processing system of claim 1, wherein the second circuitry notifies an error in response to a verification result indicating that the update file is invalid.

5. The information processing system of claim 1, wherein the second circuitry notifies an error in response to a verification result indicating that the start-up file is invalid.

6. The information processing system of claim 4, wherein the second circuitry displays, on a display, an error notification screen for notifying the error.

7. An information processing apparatus, comprising circuitry configured to:

obtain an update file and signature data, the update file being for updating a start-up file for the information processing apparatus, the signature data being for verifying the update file, the update file and the signature data being generated by another information processing apparatus;

verify the update file with the signature data in updating the start-up file with the update file;

update the start-up file with the verified update file;

generate, based on a hash value obtained based on the signature data, verification data for verifying the updated start-up file, wherein the hash value is calculated by said another information processing apparatus; and verify the updated start-up file with the verification data in starting up with the updated start-up file.

8. An information processing method performed by an information processing apparatus, the method comprising:

obtaining an update file and signature data, the update file being for updating a start-up file for the information processing apparatus, the signature data being for verifying the update file, the update file and the signature data being generated by another information processing apparatus;

verifying the update file with the signature data in updating the start-up file with the update file;

updating the start-up file with the verified update file;

generating, based on a hash value obtained based on the signature data, verification data for verifying the updated start-up file, wherein the hash value is calculated by said another information processing apparatus; and verifying the updated start-up file with the verification data in starting up the information processing apparatus with the updated start-up file.

* * * * *